United States Patent [19]
Siarkowski et al.

[11] Patent Number: 6,073,998
[45] Date of Patent: Jun. 13, 2000

[54] SEAT WARMER

[76] Inventors: Bret Siarkowski, 718 Concord Rd., Marlborough, Mass. 01752; Karl E. Becker, III, 275 Pershing, Wichita, Kans. 67218

[21] Appl. No.: 08/730,063

[22] Filed: Oct. 15, 1996

[51] Int. Cl.[7] .......................................................... A47C 7/72
[52] U.S. Cl. ............................... 297/180.12; 297/180.11; 297/180.1; 297/219.11; 297/217.3; 297/219.1; 297/217.1; 219/528; 219/548
[58] Field of Search ........................ 297/180.12, 180.11, 297/180.1, 219.11, 217.3, 219.1, 217.1; 219/528, 548, 212, 213

[56] References Cited

U.S. PATENT DOCUMENTS

| | | | |
|---|---|---|---|
| 2,712,592 | 7/1955 | Goldstein et al. | 297/180.12 X |
| 3,136,277 | 6/1964 | Richard | 297/180.12 X |
| 3,278,226 | 10/1966 | Magnusson | 297/180.11 X |
| 3,549,201 | 12/1970 | Wolfe | 297/180.12 X |
| 3,638,255 | 2/1972 | Sterrett | 297/180.1 X |
| 3,648,469 | 3/1972 | Chapman | 297/180.12 X |
| 4,139,763 | 2/1979 | McMullan et al. | 219/528 |
| 4,225,774 | 9/1980 | Taserman | 297/180.12 X |
| 4,413,857 | 11/1983 | Hayashi | 297/180.11 |
| 4,779,924 | 10/1988 | Rudel | 297/219.11 X |
| 4,797,537 | 1/1989 | Berthelius et al. | 219/528 |
| 4,869,550 | 9/1989 | Lorenzen et al. | 297/180.12 |
| 4,927,209 | 5/1990 | Maruyama | 297/180.12 |
| 4,952,776 | 8/1990 | Huguet | 219/217 |
| 4,964,674 | 10/1990 | Altmann et al. | 297/180.12 |
| 5,002,335 | 3/1991 | Bengtsson | 297/180.12 |
| 5,034,594 | 7/1991 | Beezhold et al. | 219/528 |
| 5,067,771 | 11/1991 | Ellis | 297/180.12 X |
| 5,111,025 | 5/1992 | Barma et al. | 219/217 |
| 5,380,988 | 1/1995 | Dyer | 219/548 |
| 5,405,186 | 4/1995 | Hanson et al. | 297/180.1 |
| 5,516,189 | 5/1996 | Ligeras | 297/180.11 |

FOREIGN PATENT DOCUMENTS

| | | | |
|---|---|---|---|
| 235798 | 9/1987 | European Pat. Off. | 297/180.12 |
| 2640482 | 6/1990 | France | 297/180.12 |
| 2641956 | 7/1990 | France | 297/180.11 |
| 3040888 | 5/1982 | Germany | 297/180.12 |
| 3634-160 | 4/1987 | Germany | 297/180.12 |
| 3634160 | 4/1987 | Germany | 297/180.12 |
| 3543821 | 6/1987 | Germany | 297/180.12 |
| 3818-406 | 12/1989 | Germany | 297/180.12 |
| 4139580-A1 | 6/1993 | Germany | 297/180.12 |
| 2229328 | 9/1990 | United Kingdom | 297/180.12 |
| 81/00510 | 3/1981 | WIPO | 297/180.12 |
| 84/04221 | 10/1984 | WIPO | 297/180.12 |
| 85/01482 | 4/1985 | WIPO | 297/180.12 |
| 94/09684 | 5/1994 | WIPO | 297/180.12 |

*Primary Examiner*—Peter M. Cuomo
*Assistant Examiner*—Rodney B. White
*Attorney, Agent, or Firm*—Krishnendu Gupta

[57] ABSTRACT

A seat warmer having a self-regulating heating mechanism. The heating mechanism constructed as a sheet comprising layers of a chemical-resistant and moisture-resistant material. Heating elements are enclosed between the layers for heating the sheet to a predetermined temperature. The heating elements are closely spaced to control the electrical power required by the heating mechanism to attain a predetermined temperature, whereby the heating mechanism is effective to self-regulate temperature

8 Claims, 4 Drawing Sheets

SEAT WARMER

FIELD OF THE INVENTION

The present invention relates to a seat warmer, particularly for use with vehicles such as automobiles, snowmobiles, motorcycles, construction vehicles, and all terrain vehicles (ATVs), or for use in the home.

BACKGROUND OF THE INVENTION

Conventionally various types of seat warmers and heated seats are known for use with seats of vehicles. Heated seats, seat cushions and seat warmers have been used in enclosed vehicles, such as cars, and trucks for years. These prior art heated seats and seat cushions are designed to operate primarily within enclosed vehicles, where they are not exposed to environmental elements.

However, seats on snowmobiles, motorcycles, construction vehicles and all terrain vehicles (ATVs) are exposed to harsh environmental elements such as excessive moisture from rain, snow, mud, etc. The prior art seat warmers or heated seats do not operate efficiently when used on snowmobiles, motorcycles and all terrain vehicles (ATVs).

Furthermore, the prior art seat warming devices do not operate efficiently under extreme environmental conditions, such as, low ambient temperature and wind chill. Thus, the prior art devices are unsuitable for use with snowmobiles, motorcycles, construction vehicles and all-terrain vehicles.

Also, the prior art devices are unable to effectively handle harsh riding conditions such as off road riding, where the heating/warming element in the seat may be stepped on, kneeled on, jumped on, as well as continuously flexed and vibrated. Therefore, these prior art devices are not rugged enough for use with snowmobiles, motorcycles, construction vehicles and all-terrain vehicles.

Further, prior art seats do not have the ability to generate sufficient heat with a limited power source, as is the case with snowmobiles and all-terrain vehicles, for operators that may be wearing insulating clothing such as leather, snowmobile clothing, and the like.

Also, the prior art seat warmers do not have a low profile, as required for use with snowmobiles, motorcycles, construction vehicles, ATVs and the like. A low profile is important so as not to impede the natural movement of the rider.

Another common problem experienced by prior-art seat heaters is partial protrusion of the heating elements through the seat fabric, thereby exhibiting a "show through" effect.

Hence, there is a need for a seat warmer/heated seat that can operate efficiently when exposed to environmental elements, particularly for use with vehicles such as snowmobiles, motorcycles and all terrain vehicles (ATVs).

There is also a need for a seat warmer that is designed to resist failure from the intermittent flexing of the heating elements in the seat associated with the typical rough use and harsh riding conditions that vehicles such as snowmobiles, motorcycles and all terrain vehicles (ATVs) are put to.

Further, there is also a need for a seat warmer that can quickly generate sufficient amount of heat to warm a seat using a limited power source, as is the case with the power source available on vehicles such as snowmobiles, motorcycles and all terrain vehicles (ATVs).

Also, there is a need for a seat warmer that has a low profile, a requirement that is critical for use with high performance and light weight vehicles such as, snowmobiles, motorcycles and all terrain vehicles (ATVs).

Attempts to solve some of the above mentioned problems have been made. For example, the Ligeras U.S. Pat. No. 5,516,189 describes a portable heated seat. The Ligeras heated seat however suffers from a number of limitations. For example, Ligeras teaches using a thermostat for controlling the temperature of his portable heated seat. The thermostat makes the Ligeras heated seat bulky, thereby making it unsuitable for use with snowmobiles, motorcycles and all terrain vehicles (ATVs), where a low-profile and stream-lined design is critical.

Also, temperature control devices, such as thermostats, as taught by Ligeras, have a limited life span, thereby limiting the reliability of the Ligeras portable car seat. Hence, there is a need for a "self-regulating" seat warmer that regulates seat temperature without the use of devices such as thermostats.

SUMMARY OF THE INVENTION

Accordingly, an object of the invention is a seat warmer and/or a heated seat that has a low-profile and stream-lined design.

Another object of the invention is a seat warmer and/or a heated seat that can quickly generate sufficient heat to warm a seat exposed to extremely cold weather, while using a limited power source to generate the heat.

Yet another object of the invention is a seat warmer and/or a heated seat that self-regulates its temperature, thereby eliminating the need for additional temperature control mechanisms.

Another object of the invention is a seat warmer and/or a heated seat that is rugged enough to resist failure of the heating elements from intermittent flexing of the heating elements enclosed within the seat.

A further object of the invention is a seat warmer and/or a heated seat that that can operate efficiently when exposed to environmental elements, particularly for use with vehicles such as snowmobiles, motorcycles and all terrain vehicles (ATVs). Another object of the invention is a seat warmer that does not experience partial protrusion of the heating elements through the seat fabric.

These and other objects of the invention are provided in a seat warmer, which according to the principles of the invention, comprises a self-regulating heating means having a sheet. The sheet having layers of a chemical-resistant and/or moisture-resistant material. Heating elements are enclosed between the layers for heating the sheet to a predetermined temperature. The heating elements are closely spaced to control the electrical power required by the heating means to attain a predetermined temperature, whereby the heating means is effective to self-regulate temperature.

In an alternative embodiment, the seat warmer, according to the principles of the invention, also comprises a cover for covering the heating means. The cover being effective to conduct heat generated by the heating means. The cover also being effective to attach the heating means to a seat being warmed.

It is an advantage of the invention that the seat warmer according to the principles of the invention, effective to self-regulate so that the heating elements do not exceed the predetermined temperature. The self-regulating feature eliminating the need for additional temperature regulating devices, such as thermostats.

It is another advantage of this invention, that the seat warmer according to the principles of the invention, has fewer parts than prior art devices, thereby making it easier and cheaper to manufacture.

It is yet another advantage of this invention, that the seat warmer according to the principles of the invention, requires fewer temperature regulating means, thereby improving its reliability characteristics.

The invention will be better understood and further objects, characterizing features, details and advantages thereof will appear more clearly as the following explanatory description proceeds with reference to the accompanying diagrammatic drawings given by way of non limiting example only illustrating a presently preferred specific embodiment of the invention.

DETAILED DESCRIPTION

Figure 1:
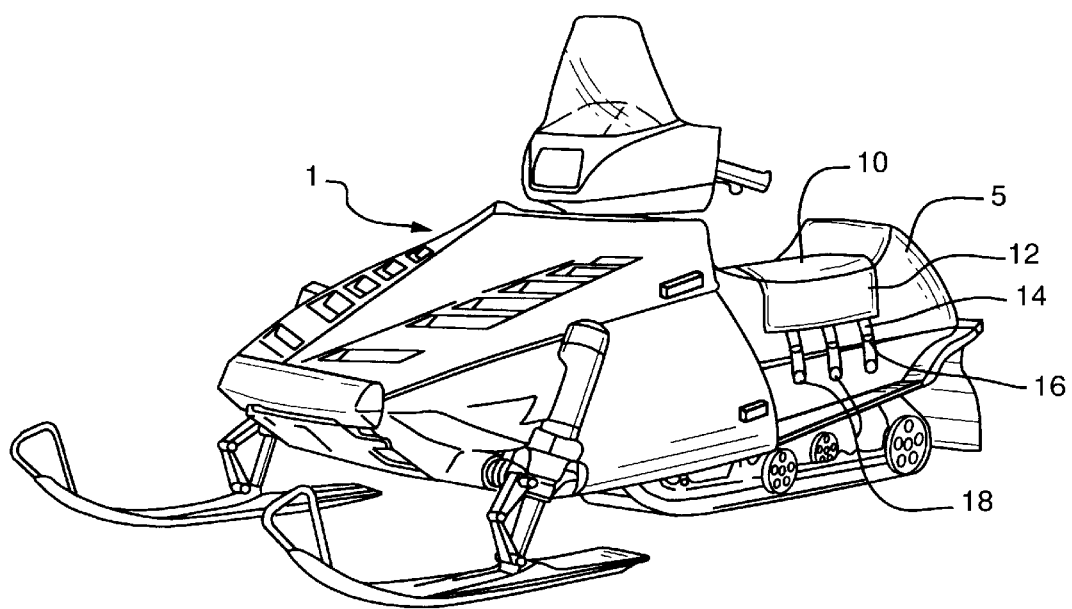
FIG. 1 is a diagrammatic perspective view of a seat warming device according to the principles of the invention, in place for use on the seat of a snowmobile.
Figure 2:
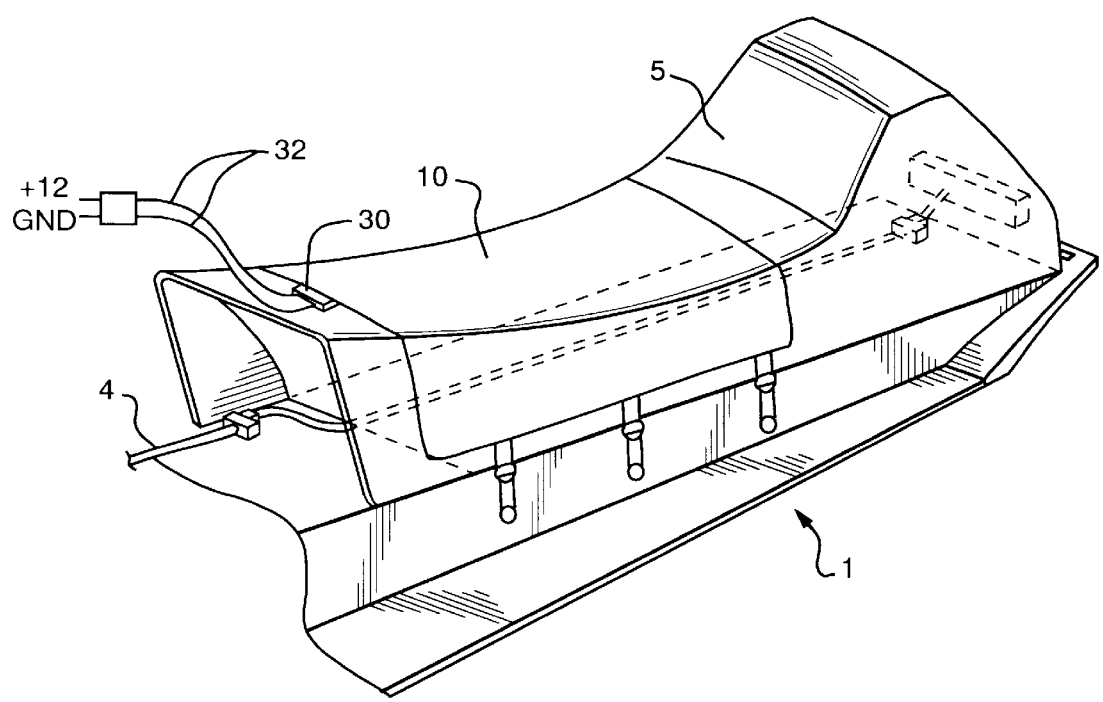
FIG. 2 is a close-up perspective view of the seat warming device of FIG. 1, according to the principles of the invention.

The invention will be explained as being applied to a snowmobile seat 5 such as shown in FIGS. 1 and 2. Referring to FIGS. 1 and 2, the seat warmer, generally designated 10, according to the principles of the invention, is shown in place for use on the seat 5 of a snowmobile 1.

Figure 3:
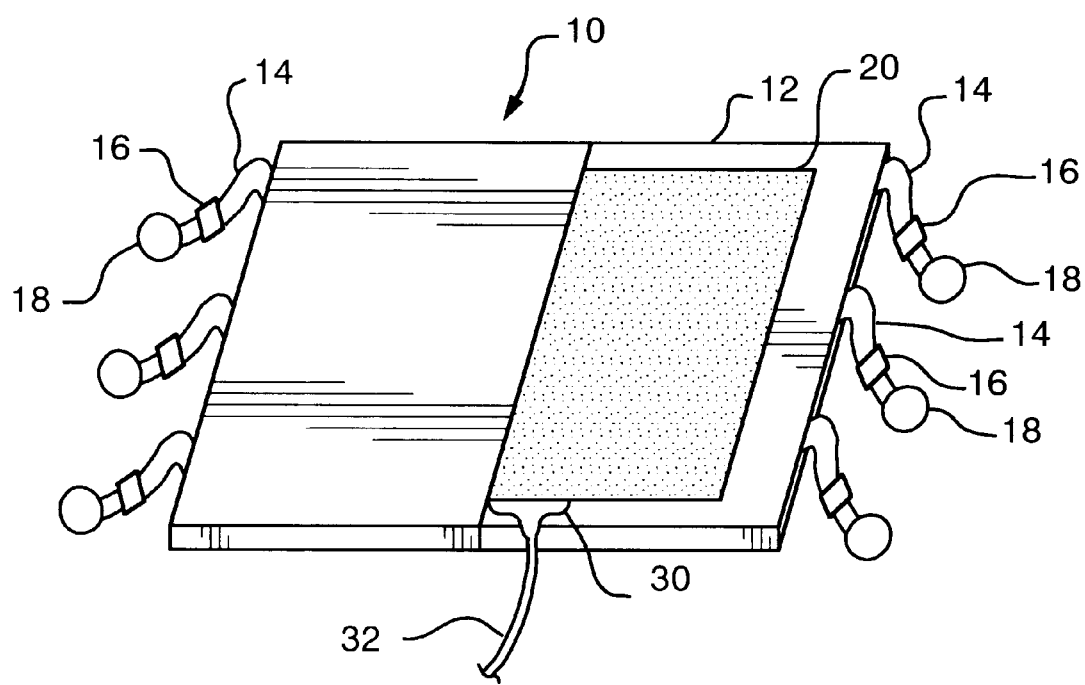
FIG. 3 is a perspective view of the seat warming device of FIG. 1, according to the principles of the invention, partially cutout, showing the heating means, which provides one component of the invention.

Referring to FIG. 3, it is seen that the seat warmer 10, comprises a heating means 20, and a cover 12, according to the principles of the invention. The cover 12 according to the principles of the invention, encloses or covers the heating means 20 enclosed therein. The cover 12 is effective to conduct heat generated by the heating means 20, to effectively transfer the heat to a rider riding the snowmobile 1 of FIG. 1. The cover 12 is also effective to attach the heating means 20 to the snowmobile seat 5 being warmed. Good results were obtained by using tough pack cloth to fabricate the cover 12.

As shown in FIGS. 1 and 2, the cover 12 has straps 14 attached to two opposite sides thereon. Each strap 14 has buckles 16, and tabs 18. The straps 14, buckles 16 and tabs 18 together allow the seat warmer 10 to be attached to the snowmobile seat 5. The tabs 18 are inserted into mating slots (not shown) that may be attached to the body of the snowmobile 1. The buckles 16, allow the straps 14 to be tightened in order to provide a snug fit of the seat warmer 10 on seat 5.

Figure 4:
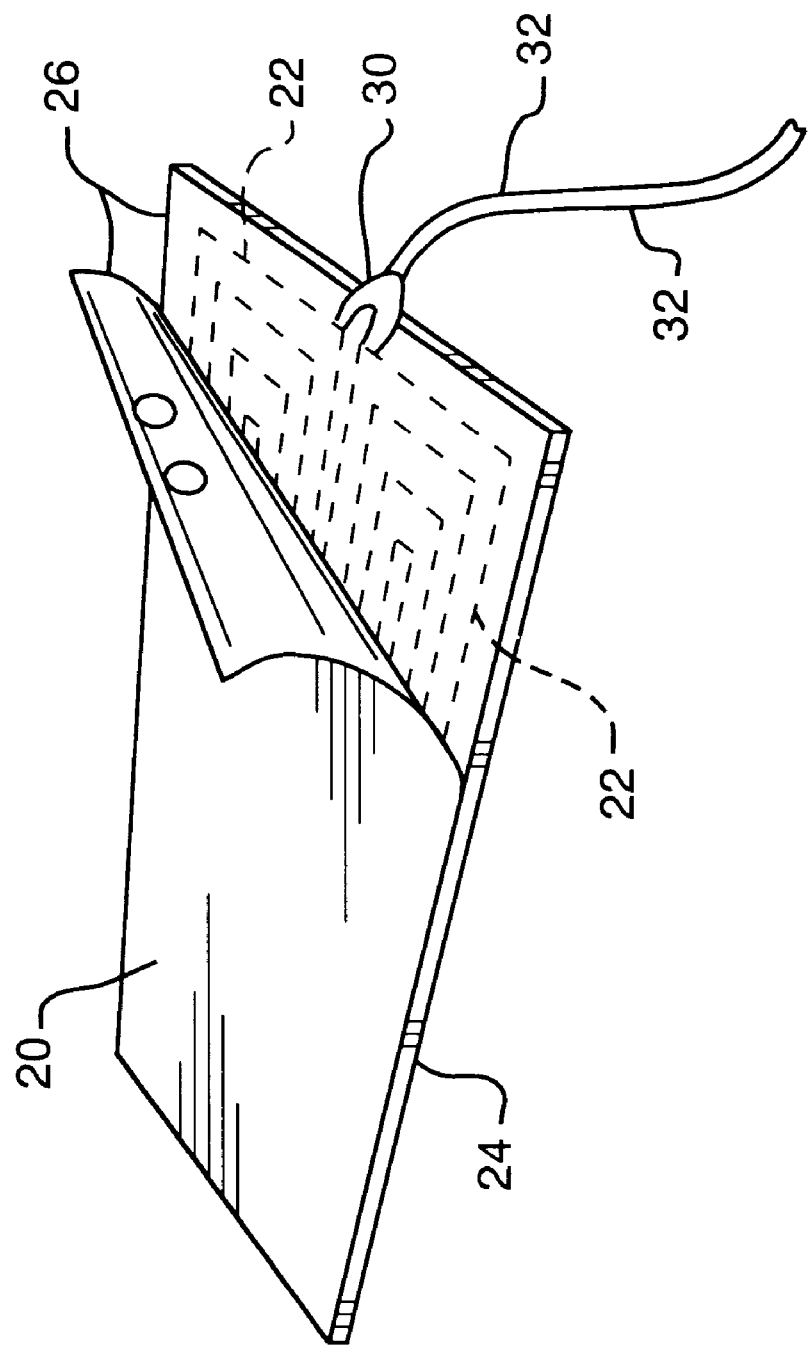
FIG. 4 is a perspective view of the heating means of FIG. 3, according to the principles of the invention.

Referring to FIG. 4, the heating means 20, also referred to as Flexible Heating Element (FHE), comprises one or more heating elements 22. As shown in FIG. 4, the heating elements 22 are enclosed or encapsulated within a sheet 24.

In the preferred embodiment of the invention, as shown in FIG. 4, each heating element 22 is a wire-wound element. Each wire-wound element is created by spiraling fine resistance wires around a fiberglass cord. Alternatively, each heating element 22 can also be an etched-foil element. An etched-foil element is created by acid etching a circuit in a 0.001 inch thick nickel resistance alloy foil.

Referring back to FIG. 4, in the preferred embodiment, the heating elements 22 are vulcanized between two layers 26 of rugged, moisture-resistant and/or chemical-resistant material, that is easily bonded or cemented to parts, such as, silicone rubber reinforced with a fiberglass mesh. Other suitable material types include neoprene, vinyl and fiberglass reinforced neoprene.

This layered sheet construction of the FHE 20, according to the principles of the invention, ensures that the heating elements 22 don't partially protrude through the cover 12.

Also, the selection of the material for the layers 26 of sheet 24, and the vulcanized layered construction, ensures that the sheet 24 has excellent physical strength and flexibility, such that repeated flexing of the heating elements 22 has no harmful effects on its performance. Therefore, the FHE 20 is able to withstand the rugged use a snowmobile seat 5 is put to.

Further, the construction of the FHE 20 according to the principles of the invention, allows the FHE 20 to readily conform to curved surfaces, including small radius bends.

The FHE 20 may be of any desired shape depending on the application and the shape of the seat to be heated. As shown in FIG. 4, in the preferred embodiment, the FHE 20 is designed to be rectangular.

Also as shown in FIG. 4, the sheet 24 has a thickness of approximately 0.055 inches. However, the sheet 24 could be designed to have a thickness in the range of 0.01 to 0.70 inches, as may be appropriate for other applications. According to the principles of the invention, the thin design of the FHE 20 ensures excellent heat transfer characteristics.

As shown in FIG. 4, according to the principles of the invention, the heating means 20 is designed to operate in an ambient temperature range of −100 F to 450 F (F=degrees Fahrenheit), and to attain a uniform surface temperature of approximately 120 F at an ambient temperature of 75 F.

The precise spacing requirements of the heating elements 22 for a given application are determined by the available voltage and the desired power density. This power density, in turn, is dependent on the highest possible temperature. As shown in FIG. 4, according to the principles of the invention, good results were obtained by placing the heating elements 22 approximately ¼ of an inch apart, to produce approximately ½ watt per square inch uniformly across the surface of the FHE 20.

The placement of the heating elements 22 in such close proximity to each other ensures that the FHE 20 can operate at a lower temperature, because the close spacing allows the FHE 20 to attain the desired temperature at a lower power density. Therefore, according to the principles of the invention, the FHE 20 can operate with heating elements 22 at a lower temperature, thereby providing improved efficiency and safety.

Further, according to the principles of the invention, by carefully specifying the spacing of the heating elements 22 and the desired power density of the FHE 20, the FHE 20, and hence the seat warmer 10, can be designed to attain a predetermined temperature, uniformly across its surface. Hence, as shown in FIG. 4, the seat warmer 10 according to the principles of the invention, self-regulates its temperature without requiring the use of a thermostat like device for temperature control.

As shown in FIGS. 2 and 4, the FHE 20 has a connector 30 attached at one edge thereon. The connector 30 is electrically connects the heating elements 22 to electrical leads 32. The electrical leads 32 connect to an electrical power source in the snowmobile 5.

The preferred embodiment of the invention has been designed to operate from a 12 volt power source, as is typically available in a snowmobile. Also, in the preferred embodiment, the heating element 22 is designed to have a resistance of 3.5 ohms, thereby drawing approximately 40 watts of power.

Further, according to the principles of the invention, the FHE 20 is able to achieve a uniform surface temperature of 101.7 F, within 5 minutes, when exposed to an ambient temperature of 73.4 F. Hence, the FHE 20 is able to achieve a fast heat-up rate, ensuring that the seat warmer 10 is able to quickly warm the seat to which it is attached.

Also as shown in FIG. 4, according to the principles of the invention, a high ratio of heater coverage to seat area was achieved by utilizing a FHE 20, having dimensions of 11×14½ inches, for a snowmobile seat 5 that measures 11×18 inches, and uniformly powered at ½ watt per square inch with a total power requirement of 9.875 watts at 12 volts.

Accordingly, for a snowmobile seat 5 that measures 11×18 inches, a seat warmer 10, having the dimensions set forth above, attained a ratio of heater coverage to seat area of 80.56% (11×14.5/11×18).

According to the principles of the invention, wattage tolerance for FHE 20 is designed to be very tight, in the range of 1 to 3%, thus ensuring very tight control on the maximum temperature attained by the FHE 20. Hence, FHE 20 does not require a thermostat for wattage regulation and temperature regulation, thereby making the FHE 20 self-regulating.

In an alternative embodiment, the FHE 20 may be enclosed within an existing automobile seat, without the use of the cover 12 to attach the FHE 20 to the seat being warmed.

In another embodiment of the invention, a safety device such as an on/off switch, or a hi/low/off switch, or a potentiometer, may be used to prevent the flow of current, in excess of a predetermined safe level, from flowing into the FHE 20.

Also, in yet another embodiment of the invention, a fuse may also be used to provide an upper limit on power supplied to the FHE 20, and thereby prevent excess current flow into the FHE 20.

The present invention has been described with reference to preferred embodiment thereof. It will be apparent to those skilled in the art that many changes can be made in the embodiment without departing from the scope of the present invention. Thus it should be understood that the scope of the present invention is not limited to this embodiment.

What is claimed is:

1. A seat warmer comprising:

a self-regulating heating means comprising a sheet, the sheet comprising layers, the layers of the sheet being constructed with a chemical-resistant and moisture-resistant material;

heating elements enclosed between the layers for the heating the sheet to a predetermined temperature, the heating elements being closely spaced to control electrical power required by the heating means to attain a predetermined temperature, whereby the heating means is effective to self-regulate temperature without the use of a thermostat type device for temperature control.

2. The seat warmer of claim 1, wherein the closely spaced heating elements are spaced approximately ¼ of an inch apart.

3. The seat warmer of claim 2, wherein the heating elements produce approximately ½ watt of electrical power per square inch of the surface of the heating means.

4. The seat warmer of claim 1 further comprising a cover for covering the heating means, the cover being effective to conduct heat generated by the heating means, the cover being effective to attach the heating means to a seat being warmed.

5. The seat warmer of claim 1 wherein the heating element comprises fine resistance wire spiraled around a fiberglass cord.

6. The seat warmer of claim 1 wherein the heating element is an etched foil element.

7. The seat warmer of claim 1 wherein the chemical-resistant and moisture-resistant material is silicone rubber.

8. The seat warmer of claim 1 wherein the heating elements are enclosed between the layers by vulcanizing the heating element between the layers.

* * * * *